(12) United States Patent
Morris et al.

(10) Patent No.: US 8,230,539 B2
(45) Date of Patent: *Jul. 31, 2012

(54) FOLD OUT RAMP

(75) Inventors: Donald Morris, Conifer, CO (US); David Johnson, Modesto, CA (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 553 days.

This patent is subject to a terminal disclaimer.

(21) Appl. No.: 12/114,663

(22) Filed: May 2, 2008

(65) Prior Publication Data

US 2008/0271269 A1    Nov. 6, 2008

Related U.S. Application Data

(60) Provisional application No. 60/916,238, filed on May 4, 2007.

(51) Int. Cl.
*E01D 1/00* (2006.01)
(52) U.S. Cl. .................................. 14/71.1; 414/921
(58) Field of Classification Search .............. 14/69.5, 14/71.1, 71.3; 414/537, 921; 296/61
See application file for complete search history.

(56) References Cited

U.S. PATENT DOCUMENTS

| | | | |
|---|---|---|---|
| 2,154,107 A | | 4/1939 | Nystrom |
| 3,274,629 A | * | 9/1966 | Gearon et al. ............... 14/71.1 |
| 4,157,742 A | * | 6/1979 | Aanensen ..................... 182/97 |
| 4,503,722 A | | 3/1985 | Suzuki |
| 4,657,233 A | | 4/1987 | Vroom |
| 5,052,521 A | | 10/1991 | Wendt |
| 5,085,555 A | | 2/1992 | Vartanian |
| 5,111,912 A | | 5/1992 | Kempf |
| 5,145,310 A | | 9/1992 | Calzone |
| 5,199,150 A | * | 4/1993 | Mortenson ..................... 29/436 |
| 5,224,722 A | | 7/1993 | Kempf |
| 5,253,410 A | * | 10/1993 | Mortenson ..................... 29/436 |
| 5,287,579 A | * | 2/1994 | Estevez, Jr. ................... 14/71.1 |
| 5,306,113 A | | 4/1994 | Mann |
| 5,316,432 A | | 5/1994 | Smalley |
| 5,342,105 A | | 8/1994 | Miles |
| 5,391,041 A | | 2/1995 | Stanbury |
| 5,449,267 A | | 9/1995 | Ablabutyan |
| 5,678,984 A | | 10/1997 | Petersen |

(Continued)

FOREIGN PATENT DOCUMENTS

DE    4413444 A1    10/1995

(Continued)

OTHER PUBLICATIONS

"EZ-Access Hitchhiker™ Wheelchair Ramp," EZ-Access, a division of Homecare Products, Inc., n.d., <http://www.homecareproducts.com/dealers/PDF_Brochures/HitchHiker.pdf> [retrieved Oct. 20, 2008], 1 page.

(Continued)

*Primary Examiner* — Gary S Hartmann
(74) *Attorney, Agent, or Firm* — Christensen O'Connor Johnson Kindness PLLC (57) ABSTRACT

A ramp assembly includes a ramp disposed within a vehicle. The ramp assembly further includes a movable floor hingedly coupled at a first end to the ramp. A reciprocating mechanism reciprocates a second end of the movable floor between a lowered position when the ramp is in the stowed position, and a raised position when the ramp is in the deployed position.

23 Claims, 10 Drawing Sheets

U.S. PATENT DOCUMENTS

| | | | |
|---|---|---|---|
| 5,791,717 A | 8/1998 | Reich | |
| 5,871,329 A | 2/1999 | Tidrick | |
| 6,125,491 A | 10/2000 | Alexander | |
| 6,179,545 B1 | 1/2001 | Petersen, Jr. | |
| 6,196,609 B1 | 3/2001 | Bowers | |
| 6,536,064 B1 | 3/2003 | Swink | |
| 6,602,041 B2 | 8/2003 | Lewis | |
| 6,698,998 B2 | 3/2004 | Koretsky | |
| 6,715,177 B1 | 4/2004 | Lagergren-Julander | |
| 6,718,886 B2 | 4/2004 | Engle | |
| 6,802,095 B1* | 10/2004 | Whitmarsh et al. | 14/71.3 |
| 6,843,635 B2 | 1/2005 | Cohn | |
| 6,860,702 B1 | 3/2005 | Banks | |
| 6,964,445 B1 | 11/2005 | Bellis, Jr. | |
| 6,988,289 B2 | 1/2006 | Pedersen | |
| 7,029,050 B1 | 4/2006 | Johnson | |
| 7,156,441 B2 | 1/2007 | Austin | |
| 7,353,558 B2 | 4/2008 | Alexander | |
| 7,533,432 B2* | 5/2009 | Morris et al. | 14/71.3 |
| 7,533,433 B2* | 5/2009 | Morris et al. | 14/71.3 |
| 7,533,434 B2* | 5/2009 | Morris et al. | 14/71.3 |
| 7,681,272 B2* | 3/2010 | Morris et al. | 14/71.3 |
| 8,032,963 B2* | 10/2011 | Morris et al. | 14/71.3 |
| 8,122,552 B2* | 2/2012 | Morris et al. | 14/71.3 |
| 8,122,553 B1* | 2/2012 | Johnson et al. | 14/71.3 |
| 8,132,281 B1* | 3/2012 | Johnson et al. | 14/71.3 |
| 2001/0048870 A1* | 12/2001 | Lewis et al. | 414/537 |
| 2002/0159871 A1 | 10/2002 | Ungetheim | |
| 2002/0197141 A1* | 12/2002 | Cohn | 414/537 |
| 2003/0071434 A1 | 4/2003 | Budd | |
| 2004/0022613 A1 | 2/2004 | Kellogg | |
| 2004/0083562 A1 | 5/2004 | Leblanc | |
| 2004/0096304 A1 | 5/2004 | Lewis | |
| 2004/0136820 A1 | 7/2004 | Cohn | |
| 2008/0271266 A1* | 11/2008 | Johnson | 14/71.1 |

FOREIGN PATENT DOCUMENTS

| | | | |
|---|---|---|---|
| DE | 202004013630 U1 | 12/2004 | |
| DE | 102004048761 A1 | 4/2006 | |
| DE | 202006012113 U1 | 12/2006 | |
| EP | 0875421 A1 | 11/1998 | |
| EP | 0976376 B1 | 12/2001 | |
| EP | 1447272 A2 | 8/2004 | |
| EP | 1738733 B1 | 1/2007 | |
| EP | 1844980 A2 | 10/2007 | |
| GB | 585917 | 2/1947 | |
| GB | 2116940 A | 10/1983 | |
| GB | 2274092 A | 7/1994 | |
| GB | 2301082 A | 11/1996 | |
| GB | 2306152 A | 4/1997 | |
| GB | 2369344 A | 5/2002 | |
| JP | 2001239888 A | 9/2001 | |
| JP | 2008230270 A | 10/2008 | |
| WO | 01/47746 A1 | 7/2001 | |
| WO | 2005/123450 A1 | 12/2005 | |

OTHER PUBLICATIONS

"Lift-U® Fold-Out Plus (LU11)," Configuration Drawing, Hogan Mfg., Inc., n.d., <http://liftu.hoganmfg.com/resources/docs/products/lu-11/32inWide_X_12inRise_Rev A.pdf> [retrieved Oct. 20, 2008], 4 pages.

"Lift-U® Fold-Out Plus (LU11)," Product Brochure, Hogan Mfg., Inc., n.d., <http://liftu.hoganmfg.com/resources/docs/products/lu-11/LU11_Brochure_080924.pdf> [retrieved Oct. 20, 2008], 2 pages.

"Powerleaf," Deans Systems, n.d., <http://doorsystemsgroup.net/index.php?option=com_content&view=article&id=58&Itemid=84> [retrieved Oct. 20, 2008], 1 page.

"Products: Transit/Motorcoach," Ricon Corp. ©2007, <http://www.riconcorp.com/pdfs/ricon_ramps.pdf> [retrieved Oct. 20, 2008], 2 pages.

"RA400 Transit Ramp," The Braun Corporation, n.d., <http://www.braunmoblity.com/products/commlif/media/RA400.pdf> [retrieved Oct. 20, 2008], 2 pages.

* cited by examiner

FOLD OUT RAMP

CROSS-REFERENCE TO RELATED APPLICATION

This application claims the benefit of U.S. Provisional Application No. 60/916,238, filed on May 4, 2007, the disclosure of which is expressly incorporated by reference.

TECHNICAL FIELD

The present disclosure relates generally to wheelchair ramps and, more particularly, to fold out ramps for vehicles.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis in providing systems that assist such a person to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping deployed position. In the deployed position, the ramp is adjustable to varying curb heights.

Fold out ramps on vehicles confront a variety of technical problems. Longer ramps are desirable because the resulting slope is lower and more accessible by wheelchair-bound passengers. Longer ramps are, however, heavier and require more torque about the pivot axis to be reciprocated between deployed and stowed positions. To satisfy this torque requirement, such fold out ramps use large electric motors, pneumatic devices, or hydraulic actuators to deploy and stow the ramp. Many of these systems cannot be moved manually in the event of failure of the power source unless the drive mechanism is first disengaged. Some existing fold out ramps can be deployed or stowed manually, but they are difficult to operate because one must first overcome the resistance of the drive mechanism. Further, fold out ramps require a depression (or pocket) in the vehicle's vestibule floor in which to store the retracted/stowed ramp. When the ramp is deployed, the aforementioned depression presents an obstacle for wheelchair passengers as they transition from the ramp to the vestibule, and on into the vehicle.

As noted above, many existing fold out ramps are equipped with hydraulic, electric, or pneumatic actuating devices. Such devices are obtrusive and make access to and from a vehicle difficult when the ramp is stowed. Moreover, many of such fold out ramps have no energy storage capabilities to aid the lifting of the ramp, which would preserve the life of the drive motor or even allow a smaller drive to be employed. Finally, operating systems for such fold out ramps must have large power sources to overcome the moment placed on the hinge by the necessarily long moment arm of the fold out ramp.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A disclosed embodiment of a ramp assembly is suitable for use with a vehicle having a floor. The ramp assembly includes a ramp disposed within the vehicle and a movable floor hingedly coupled at a first end to a first end of the ramp. A reciprocating mechanism reciprocates a second end of the movable floor between a lowered position when the ramp is in the stowed position, and a raised position when the ramp is in the deployed position.

An alternate embodiment of a disclosed ramp assembly is suitable for use with a vehicle having a floor. The ramp assembly includes a support member coupled to the vehicle and a ramp attached to the support member so that rotation of the support member reciprocates the ramp between a stowed position and a deployed position. A movable floor has a first end hingedly coupled to the ramp to define a hinge line so that rotation of the support member reciprocates the hinge line between a raised position when the ramp is in the stowed position and a lowered position when the ramp is in a deployed position. A reciprocating mechanism reciprocates a second end of the movable floor between a lowered position when the ramp is in the stowed position, and a raised position when the ramp is in the deployed position.

A second alternate embodiment of a ramp assembly is suitable for use with a vehicle having a floor. The ramp assembly includes a support member rotatably coupled to the vehicle and a ramp attached to the support member so that rotation of the support member reciprocates the ramp between a stowed position and a deployed position. A movable floor has a first end hingedly coupled to the support member to define a hinge line so that rotation of the support member moves the hinge line in an arcuate path. A drive assembly is operatively coupled to the support member to rotate the support member. A reciprocating mechanism reciprocates a second end of the movable floor between a lowered position when the ramp is in the stowed position, and a raised position when the ramp is in the deployed position.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments of the present invention will now be described with reference to the accompanying drawings where like numerals correspond to like elements. Exemplary embodiments of the disclosed subject matter are directed to ramp assemblies, and more specifically, to wheelchair ramp assemblies. In particular, several embodiments are directed to wheelchair ramp assemblies suitable for use in buses, vans, etc. Several embodiments are directed to compact ramp assemblies for a vehicle that when stowed occupies a small amount of space within the vehicle floor, yet deploys to a length that effectively reduces the ramp slope encountered by the mobility impaired, thus facilitating greater independence and safety for wheelchair-bound passengers.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the claimed subject matter. Thus, it will be apparent to one skilled in the art that aspects of the present disclosure may be employed with other ramp assemblies used in stationary installations, such as residential buildings and the like. The following detailed description may use illustrative terms such as vertical, horizontal, front, rear, inboard, outboard, proximal, distal, etc. However, these terms are descriptive in nature and should not be construed as limiting. Further, it will be appreciated that embodiments of the present disclosure may employ any combination of features described herein.

Fold Out Ramp Assembly

Figure 1:
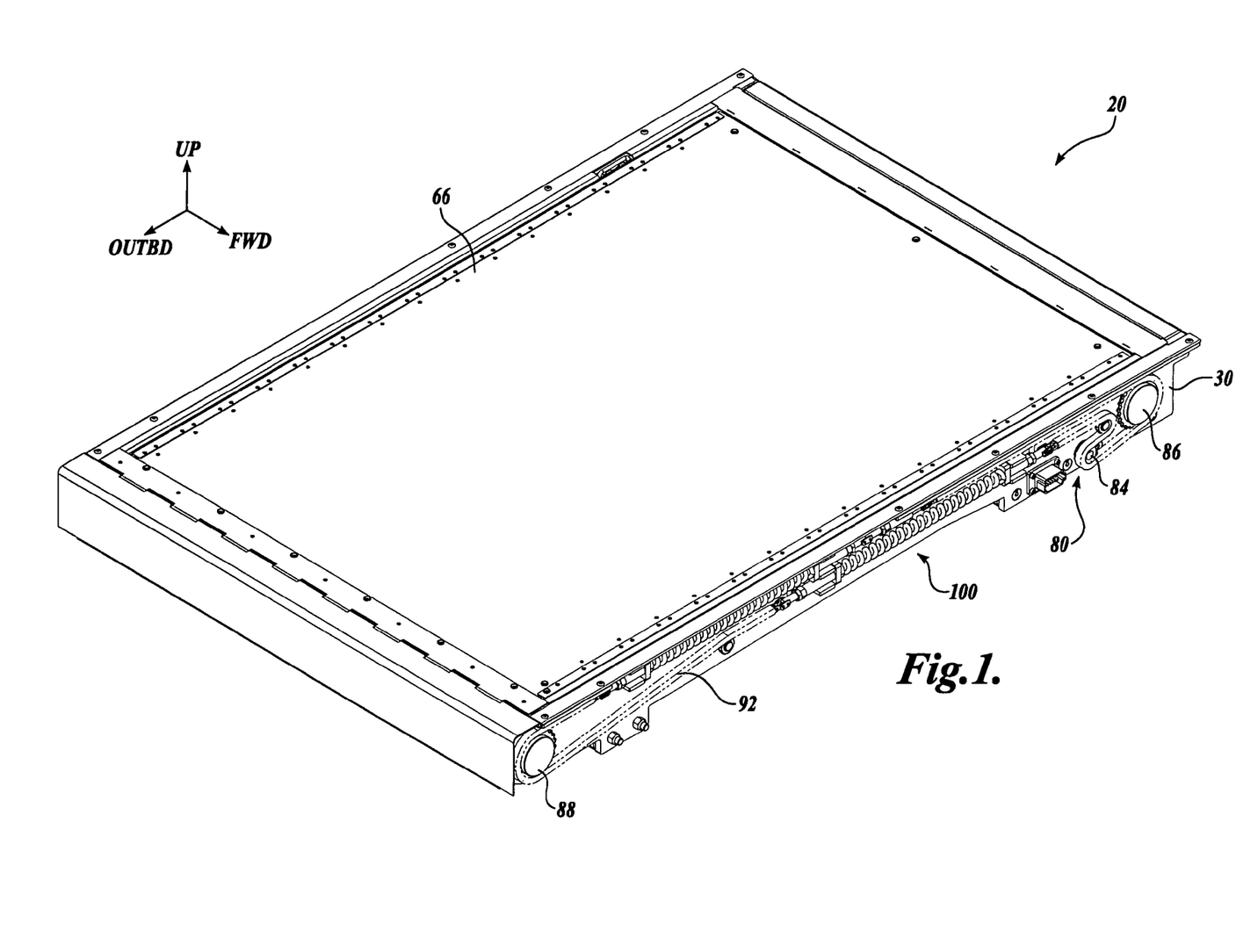
FIG. 1 is an isometric view of one exemplary embodiment of a disclosed ramp assembly, with the ramp assembly in a stowed position.
Figure 2:
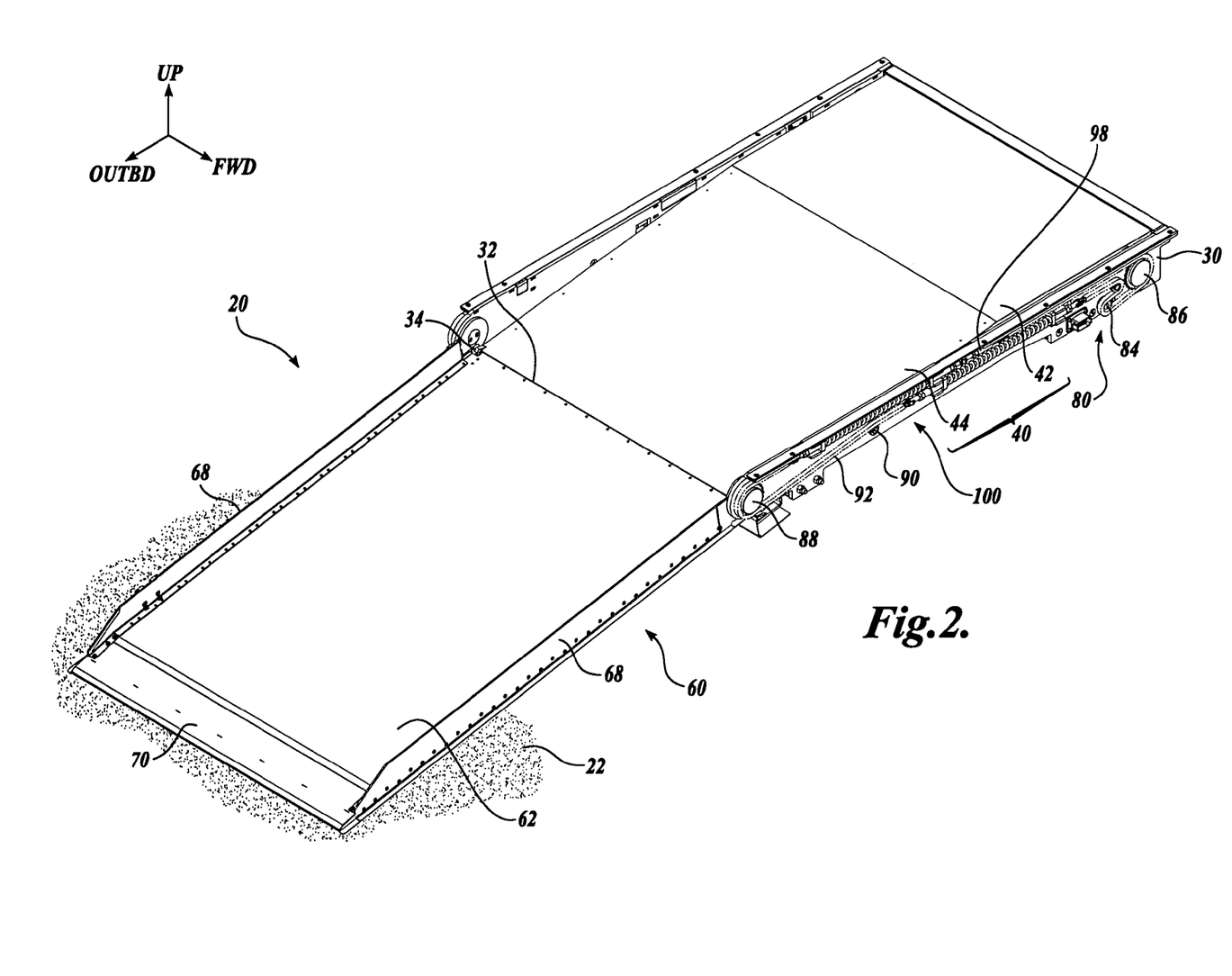
FIG. 2 is an isometric view of the ramp assembly shown in FIG. 1, with the ramp assembly in a deployed position.

FIGS. 1 and 2 illustrate one embodiment of a fold out ramp assembly 20 (hereinafter "ramp assembly 20"). The ramp assembly 20 includes a frame 30, a drive assembly 80, an outboard ramp 60, a movable floor 40, and a counterbalance assembly 100. The frame 30 of the ramp assembly 20 is adapted to be mounted to a vehicle (not shown), such as a bus or a van. The ramp assembly 20 is reciprocal between the stowed position, as shown in FIG. 1, and a deployed position, as shown in FIG. 2. In the stowed position, the outboard ramp 60 and movable floor 40 are located such that the outboard ramp 60 is positioned over the movable floor 40, and the lower surface 66 of the outboard ramp 60 is substantially coplanar, i.e., flush, with the floor (not shown) of the vehicle. In a deployed position, the outboard ramp extends outward and downward to contact a surface 22, such as a curb or road side.

Although the illustrated embodiments of the ramp assembly 20 include a frame 30, other embodiments are contemplated in which the ramp assembly 20 does not include a frame 30. When such embodiments are installed in vehicles, the ramp assembly 20 components are attached directly to the structure of the vehicle or to a suitable structure within the vehicle, thus making a frame 30 unnecessary. Similarly, when such embodiments are installed in stationary installations, such as residential buildings and the like, the ramp assembly 20 components are attached to the structure of the building or any other suitable structure within the building. Accordingly, embodiments of the described ramp assembly 20 that do not include a frame, should be considered within the scope of the present disclosure.

Referring to FIG. 2, the outboard ramp 60 is rotatably connected to the frame 30 and hingedly coupled to the movable floor 40. The outboard ramp 60 includes a panel 62, which is constructed from well-known materials. The outboard ramp 60 further includes side curbs 68. The side curbs 68 extend upwardly from the forward an rear sides of the panel 62. Each side curb 68 enhances the structural strength of the outboard ramp 60 and provides edge guards for the sides of the outboard ramp 60, thereby increasing the safety of the ramp assembly 20. The outboard edge of the outboard ramp 60 includes a tapered nose portion 70. The tapered nose portion 70 provides a smooth transition between the panel 62 and the curb or sidewalk when the ramp assembly 20 is in a deployed position.

Figure 6:
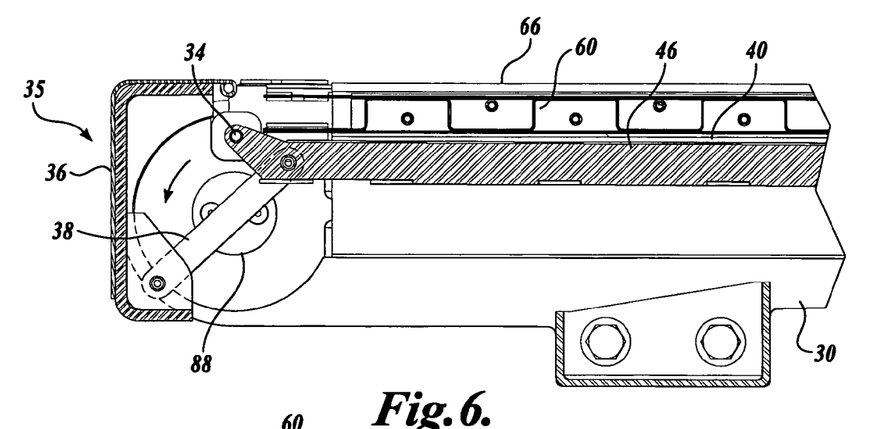
FIG. 6 is a partial cross-sectional side view of the outboard support shown in FIG. 4, with the outboard ramp in the stowed position.
Figure 9:
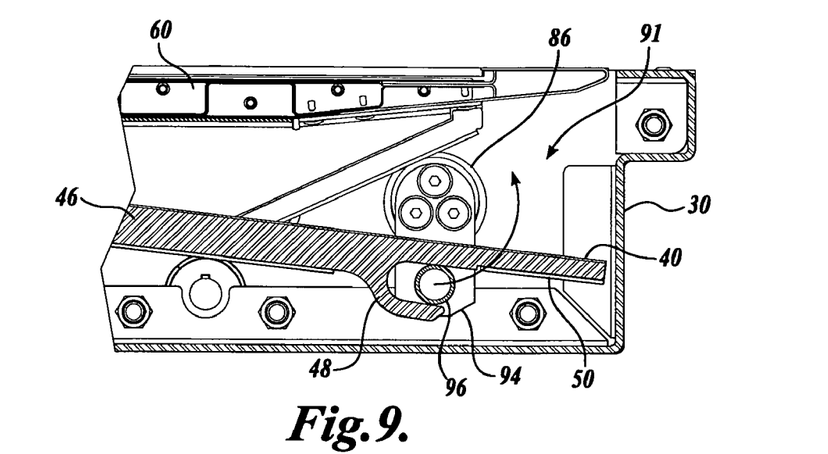
FIG. 9 is a partial cross-sectional side view of the inboard support shown in FIG. 5, with the outboard ramp in the stowed position.

The movable floor 40 includes an inboard portion 42 fixedly located at an angle relative to a sloping outboard portion 44. When the outboard ramp 60 is stowed, the movable floor 40 is disposed within the frame 30 and below the outboard ramp 60 in a lowered position as best shown in FIGS. 6 and 9. As the outboard ramp 60 is deployed, the inboard portion 42 of the movable floor 40 moves in an upward direction until the inboard portion 42 of the movable floor 40 is substantially horizontal and coplanar with the floor of the vehicle as best shown in FIG. 2. In this position, the outboard portion 44 of the movable floor 40 extends from the inboard portion 42 of the movable floor 40 in an outboard and downward direction to edge 32 that abuts the outboard ramp 60 to the movable floor 40. When the outboard ramp 60 is deployed, the outboard portion 44 of the movable floor 40 is substantially parallel to the outboard ramp 60. Because the ramp is capable of providing a transition to surfaces having different heights, e.g., a curb, a street surface, a driveway, etc., the amount that the outboard ramp 60 rotates to a deployed position will vary. Accordingly, while the outboard portion 44 of the movable floor 40 is substantially parallel to the outboard ramp 60, the angle between the outboard portion 44 of the movable floor 40 and the outboard ramp 60 may be up to 20 degrees.

Because the slope of the outboard portion 44 of the movable floor 40 approximates that slope of the outboard ramp 60, outboard portion 44 of the movable floor 40 effectively increases the overall length of the sloped portion of the deployed ramp assembly 20, thereby providing a more gradual slope without increasing the length of the outboard ramp 60. Because the length of the outboard ramp 60 is not increased, the torque required from the drive motor 82 to reciprocate the outboard ramp 60 between the stowed position and a deployed position is not increased.

The drive assembly 80 actuates the outboard ramp 60 to reciprocate between the stowed position and a deployed position. A forward portion of the drive assembly is located on the forward side of the frame 30. A rear portion of the drive assembly 80 is similarly located on the rear side of the frame 30, wherein each element of the forward portion of the drive assembly 80 corresponds to a similar element of the rear portion of the drive assembly 80. For the sake of clarity, the forward portion of the drive assembly 80 is described herein with the understanding that unless otherwise indicated, each element of the forward portion has a corresponding element on the rear portion of the drive assembly 80.

Referring to the embodiment shown in FIGS. 1 and 2, the drive assembly 80 includes an inboard sprocket 86 that is rotatably coupled to the inboard end of the forward side of the frame 30. The inboard sprocket 86 is oriented to have an axis of rotation that extends in the forward/rearward direction. The drive assembly 80 also includes an outboard sprocket 88 that is rotatably coupled to the outboard end of the forward side of the frame 30. The outboard sprocket 88 is oriented to have an axis of rotation that is substantially parallel to the axis of rotation of the inboard sprocket 86. A drive chain 92 forms an endless loop that engages the teeth of the outboard sprocket 88 and the teeth of the inboard sprocket 86. Movement of the drive chain 92 along the path of the drive chain 92 rotates the inboard sprocket 86 and the outboard sprocket 88.

Figure 15:
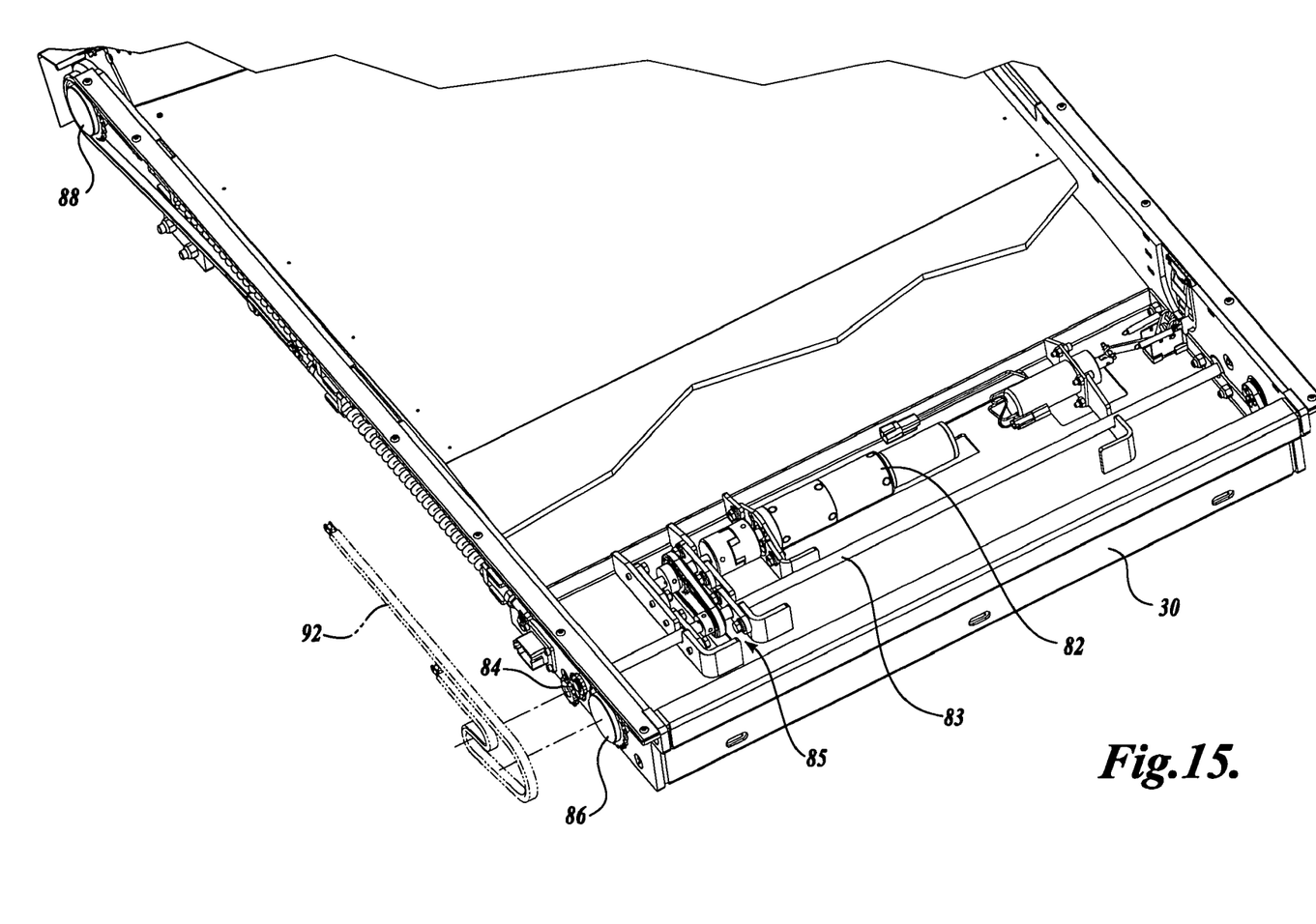
FIG. 15 is an isometric, partial cut-away view of the ramp assembly shown in FIG. 1, with the outboard ramp in a position between the stowed position and a deployed position.

The drive assembly 80 further includes a drive sprocket 84 that is rotatably coupled to the forward side of the frame 30 intermediate to the inboard sprocket 86 and outboard sprocket 88. The drive sprocket 84 is oriented to have axis of rotation substantially parallel to the axes of rotation of the inboard sprocket 86 and outboard sprocket 88. As shown in FIG. 15, a drive shaft 83 is coupled to the drive sprocket 84 for connecting the drive sprocket 84 to a motor 82, wherein the drive shaft 83 is operatively coupled to the motor 82 by a well known transmission means 85. The motor 82 is selectively operated to rotate the drive sprocket 84, thereby driving the inboard sprocket 86 and the outboard sprocket 88 via the drive chain 92. In one embodiment, a single motor 82 drives the drive sprocket 84 of the forward portion of the drive assembly 80 and also the drive sprocket 84 of the rear portion of the drive assembly 80. In another embodiment, each drive sprocket 84 is driven by a separate motor 82.

One or more idler sprockets 90 may be included in the drive assembly 80. The optional idler sprockets 90 engage the drive chain 92 to redirect the drive chain 92 along a predetermined path. The drive chain 92 includes a turnbuckle 98 that is selectively adjustable to increase or decrease the length of the drive chain 92 in order to adjust the tension of the drive chain 92.

Figure 3:
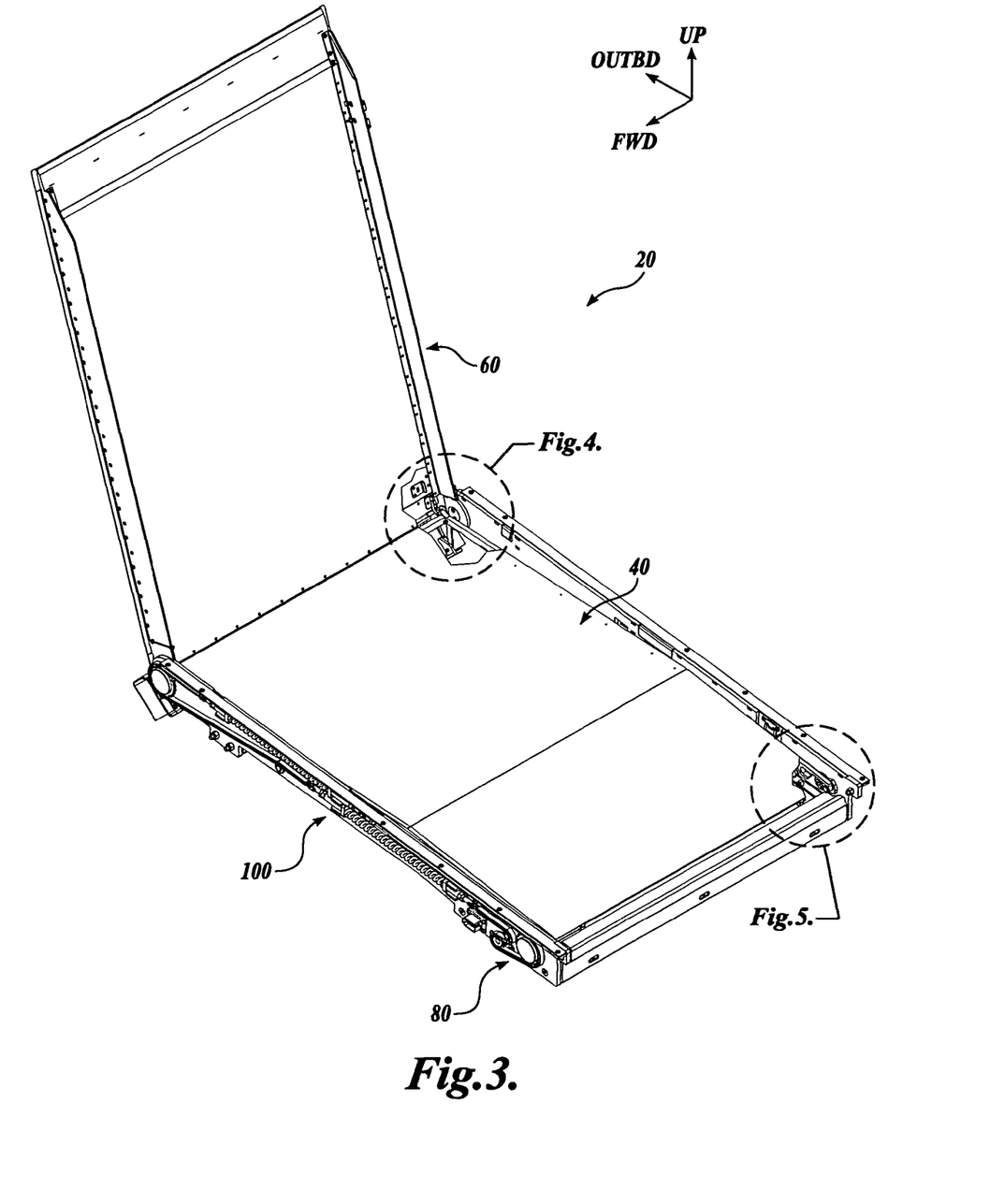
FIG. 3 is an isometric, partial cut-away view of the ramp assembly shown in FIG. 1, with the ramp assembly in a position between the stowed position and a deployed position.
Figure 4:
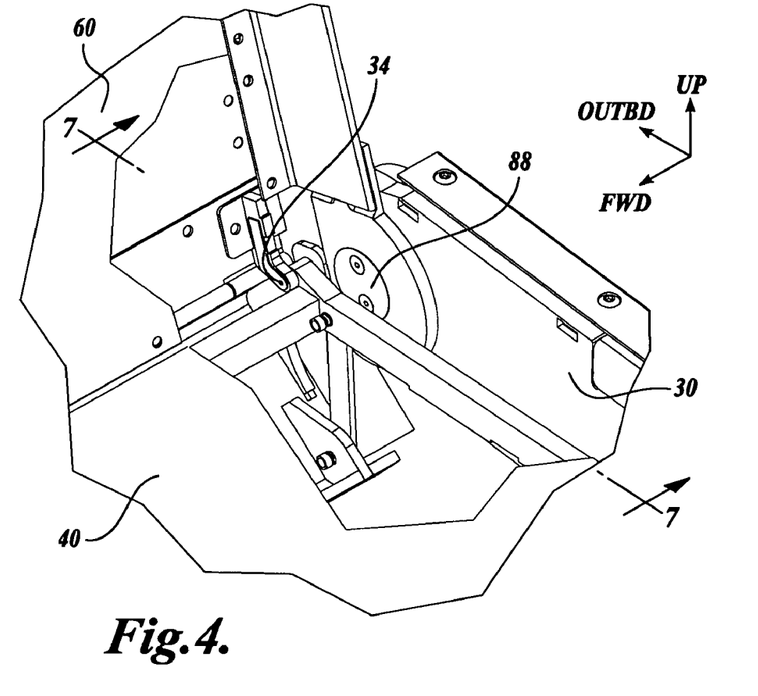
FIG. 4 is an isometric, partial cut-away view of an outboard support of a movable floor of the ramp assembly shown in FIG. 3.
Figure 5:
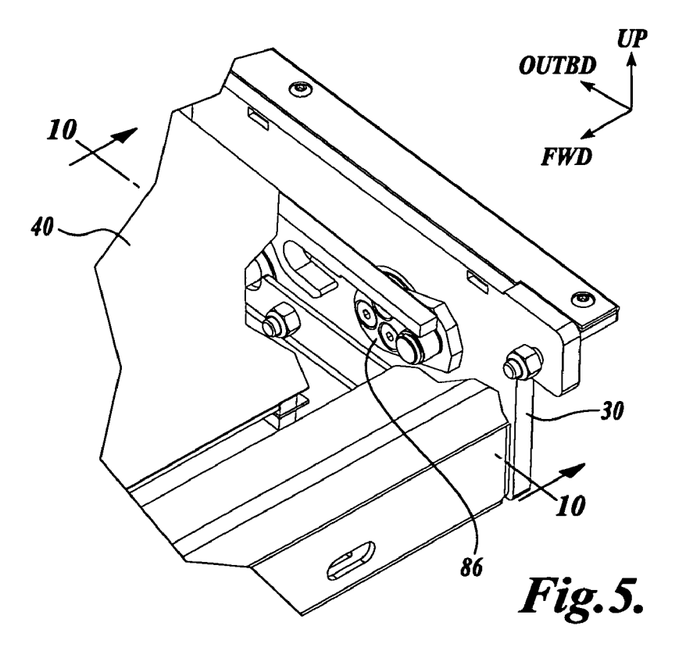
FIG. 5 is an isometric, partial cut-away view of an inboard support of the movable floor of the ramp assembly shown in FIG. 3.

As illustrated in FIGS. 3-5, the inboard sprockets 86 and outboard sprockets 88 of the drive assembly 80 rotate cooperatively to reciprocate the ramp assembly 20 between the stowed position and a deployed position. More specifically, the outboard sprockets 88 rotate to reciprocate the outboard ramp 60 between the stowed position and a deployed position. At the same time, the inboard sprockets 86 and outboard sprockets 88 cooperate to raise and lower the movable floor 40 as the outboard ramp 60 reciprocates between the stowed position and a deployed position.

The described drive assembly is exemplary only and should not be construed as limiting. In this regard, it should be appreciated that alternate drive assemblies may include belts, pulleys, gears, or other known system for transferring rotational motion from a motor to a ramp actuation system. In addition, alternate embodiments are contemplated in which the number and arrangement of drive assembly components are varied.

Actuation of the Outboard Ramp

Figure 7:
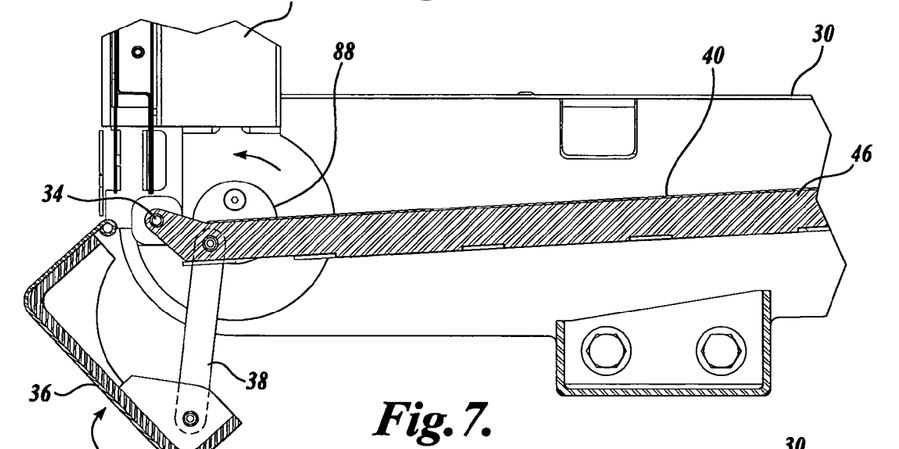
FIG. 7 is a partial cross-sectional side view of the outboard support shown in FIG. 4, with the outboard ramp positioned between the stowed position and a deployed position.
Figure 8:
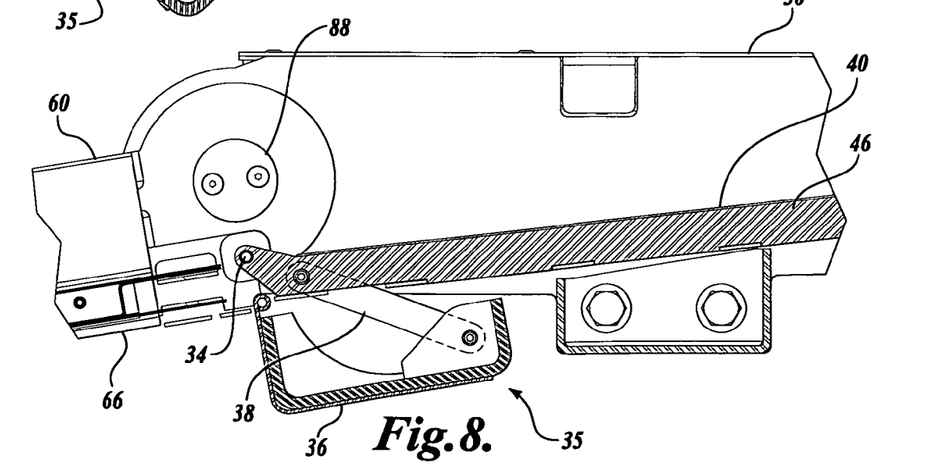
FIG. 8 is a partial cross-sectional side view of the outboard support shown in FIG. 4, with the outboard ramp in a deployed position.

FIGS. 6-8 illustrate the outboard sprocket 88, which acts as a support member to support the outboard ramp 60 as it drives the outboard ramp 60 from the stowed position (FIG. 6), through an intermediate position (FIG. 7), to a deployed position (FIG. 8). Referring to FIG. 6, a portion of the outboard sprocket 88 that is disposed within the frame 30 is shown. The outboard ramp 60 is fixedly attached to a portion of the outboard sprocket 88 that extends axially through the frame 30 into the interior portion of the frame 30. The lower surface 66 of the outboard ramp 60, which faces upward when the ramp assembly 20 is in the stowed position, is offset from the axis of rotation of the outboard sprocket 88 so that the lower surface 66 is generally horizontal and coplanar with the floor of the vehicle when the ramp assembly 20 is in the stowed position.

To move the outboard ramp 60 from the stowed position to a deployed position, the outboard sprocket 88 is driven by the drive assembly 80 to rotate in a counterclockwise direction. The outboard ramp 60 rotates with the outboard sprocket 88 until the tapered nose 70 of the outboard ramp 60 contacts a surface 22 of the road or sidewalk, at which point the outboard ramp 60 is in a deployed position.

Conversely, to move the outboard ramp 60 from a deployed position to the stowed position, the drive assembly 80 rotates the outboard sprocket 88 in a clockwise direction as viewed in FIGS. 6 and 7 (i.e., the direction opposite the arrows shown in FIGS. 6 and 7). The outboard ramp 60 rotates with the outboard sprocket 88 until the lower surface 66 of the outboard ramp 60 is generally horizontal and coplanar with the floor of the vehicle, at which point the outboard ramp 60 is in the stowed position. In the stowed position, the outboard ramp is supported at its edges by the frame 30 or the vehicle floor. By selectively operating the motor 82 of the drive assembly 80, the outboard ramp 60 is reciprocated between the stowed position and a deployed position.

Actuation of the Movable Floor i. Outboard End

Still referring to FIGS. 6-8, the outboard end of the movable floor 40 travels in an arcuate path with the rotation of the outboard sprocket 88. As shown in FIG. 4, the outboard end of the movable floor 40 is hingedly coupled to the outboard ramp. In the illustrated embodiment, hinge pins 34 are located at the forward and rear sides of the outboard end of the movable floor 40. The hinge pins 34 are positioned along a common hinge line, which is substantially parallel to, but offset from, the axis of rotation of the outboard sprockets 88. As previously described, when the outboard sprocket 88 rotates, the outboard ramp 60 reciprocates between the stowed position and a deployed position. As the outboard ramp 60 moves, the hinge line, the position of which is fixed relative to the outboard ramp 60, moves in an arcuate path around the axis of rotation of the outboard sprocket 88. Because the position of the hinge line is also fixed relative to the movable floor 40, as the outboard sprocket 88 rotates, the inboard end of the movable floor 40 also travels in an arcuate path around the axis of rotation of the outboard sprocket 88.

As shown in FIG. 6, when the outboard ramp 60 is in the stowed position, the hinge pin 34 is located above the axis of rotation of the outboard sprocket 88, and the outboard portion 44 of the movable floor 40 is in a raised position. Referring to FIGS. 7 and 8, as the outboard ramp 60 is deployed, the hinge pin 34, and thus the outboard end of the movable floor 40, travels in a counterclockwise direction until the outboard ramp 60 is in a deployed position. When the outboard ramp 60 is in a deployed position, the hinge pin 34 is located below the axis of rotation of the outboard sprocket 88, and the outboard portion 44 of the movable floor 40 has a downward slope approximately equal to the slope of the deployed outboard ramp 60. When the outboard ramp 60 is moved from a deployed position to the stowed position, the hinge pin 34 moves in a clockwise direction, and the outboard end of the movable floor 40 is raised.

As shown in FIG. 6, a closeout assembly 35 includes an end cap 36 with an upper end pivotally connected to the inboard end of the outboard ramp 60 (when the outboard ramp 60 is in a deployed position) so that the pivot location is generally above the outboard sprocket 88 when the outboard ramp 60 is in the stowed position. The end cap 36 extends in a forward and rearward direction to cover the outboard end of the frame 30 when the outboard ramp 60 is in the stowed position. The closeout assembly 35 reduces the amount of dirt and debris that can make its way into the interior portion of the frame 30, thereby reducing wear of the ramp assembly 20 components The closeout assembly 35 also provides a step edge and cover for when the outboard ramp 60 is in the stowed position, and people enter and exit the vehicle on foot.

The closeout assembly 35 further includes a link 38 pivotally coupled to the lower end of the end cap 36 with a pinned connection. The other end of the link 38 is pivotally coupled to the movable floor 40 by a second pinned connection. As the outboard ramp 60 moves between the stowed position and a deployed position, the upper end of the end cap 36 moves in an arcuate path with the outboard sprocket 88. At the same time, the lower end of the end cap 36 is driven by the link 38 to a location under and inboard of the outboard sprocket 88. As a result, as shown in FIGS. 6-8, when the outboard ramp 60 moves from the stowed position to a deployed position, the end cap 36 moves from a closed position around the axis of the outboard sprocket 88 and out of the path of the outboard ramp 60 to an open position beneath the movable floor 40.

ii. Inboard End

Figure 10:
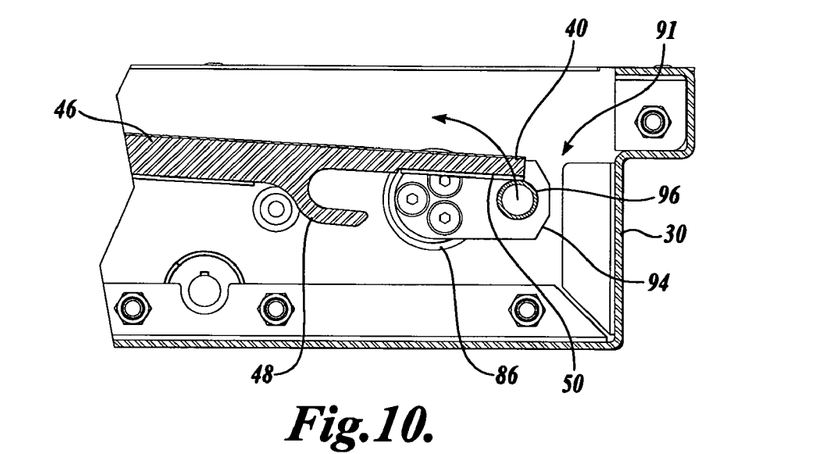
FIG. 10 is a partial cross-sectional side view of the inboard support shown in FIG. 5, with the outboard ramp positioned between the stowed position and a deployed position.
Figure 11:
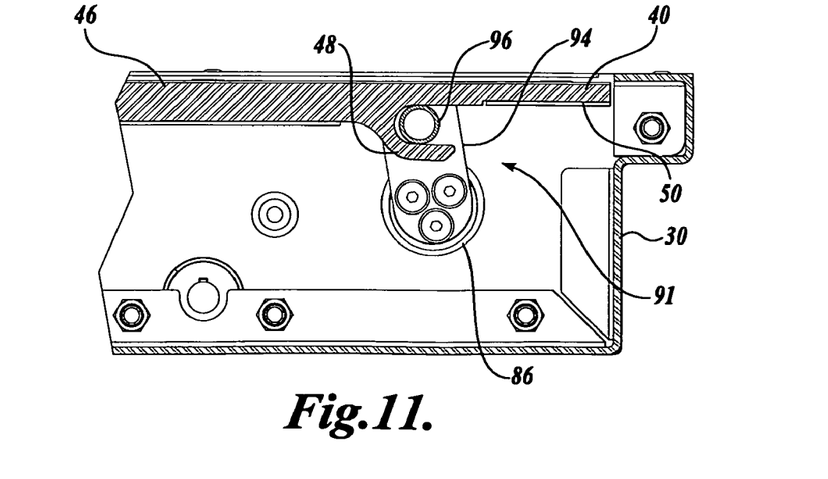
FIG. 11 is a partial cross-sectional side view of the inboard support shown in FIG. 5, with the outboard ramp in a deployed position.

FIGS. 9-11 illustrate a reciprocating mechanism 91 that raises the inboard end of the movable floor 40 as the outboard ramp 60 moves from the stowed position (FIG. 9), through an intermediate position (FIG. 10), to a deployed position (FIG. 11). Referring to FIG. 9, a first end of a link 94 is fixedly coupled to the inboard sprocket 86. The link 94 extends radially from the inboard sprocket 86 so that the second end of the link 94 revolves around the axis of rotation of the inboard sprocket 86 as the inboard sprocket 86 is rotated by the drive assembly 80. A follower bearing 96 is rotatably coupled to the second end of the link 94 so that the axis of rotation of the follower bearing 96 is approximately parallel to the axis of rotation of the inboard sprocket 86. The follower bearing 96 travels in an arcuate path around the axis of rotation of the inboard sprocket 86 when the drive assembly 80 drives the inboard sprocket 86.

A side support 46 extends along the lower edge of the movable floor 40 from the inboard portion of the movable floor 40 to the outboard portion of the movable floor 40. The side support 46 includes a protrusion that extends from the inboard portion of the side support 46 in an inboard and downward direction to form a C-shaped catcher 48. The catcher 48 opens toward the inboard end of the ramp assembly 20. The lower portion of the side support that is located inboard of the catcher 48 includes a bearing surface 50.

As shown in FIG. 9, when the outboard ramp 60 is in the stowed position, the link 94 extends downward from the inboard sprocket 86. As a result, the follower bearing 96 is positioned below the axis of rotation of the inboard sprocket 86. The follower bearing 96 engages the bearing surface 50 of the side support 46, thereby supporting the inboard end of the movable floor 40.

Referring to FIG. 10, when the outboard ramp 60 moves from the stowed position to a deployed position, the inboard sprocket 86 rotates in a counterclockwise direction. While the follower bearing 96 travels along an arcuate path as a result of the motion of the inboard sprocket 86, the follower bearing 96 maintains contact with the bearing surface 50. Thus, the follower bearing 96 provides continuous support to the inboard end of the movable floor 40 as the follower bearing 96 travels along an arcuate path, thereby raising the inboard end of the movable floor 40.

FIG. 11 shows the inboard end of the movable floor 40 when outboard ramp 60 is in a deployed position. The follower bearing 96 is generally positioned above the axis of rotation of the inboard sprocket 86 and is disposed within the catcher 48. The follower bearing 96 supports the inboard portion 42 of the movable floor 40 so that the upper surface of the movable floor 40 is generally horizontal and coplanar with the floor of the vehicle. If external forces tend to raise the inboard end of the movable floor 40, the follower bearing 96 engages the catcher, thereby preventing the inboard end of the movable floor 40 from moving in an upward direction.

When the outboard ramp 60 is moved from a deployed position to the stowed position, the inboard sprocket 86 rotates in a clockwise direction as viewed in FIGS. 9 and 10 (i.e., the direction opposite the arrows shown in FIGS. 9 and 10), and the follower bearing 96 travels in a downward arcuate path. The inboard end of the movable floor 40, which is supported by the follower bearing 96, travels downward with the follower bearing 96 until the outboard ramp 60 is in the stowed position. When the outboard ramp 60 is in the stowed position, the inboard end of the movable floor 40 is disposed within the frame 30 in a lowered position.

As previously discussed, the drive chain 92 coordinates the rotation of the inboard sprocket 86 and the outboard sprocket 88. Accordingly, the inboard sprocket 86 and the outboard sprocket 88 cooperate to control the position of the movable floor 40. When the outboard ramp 60 is in the stowed position, the inboard end of the movable floor 40 is in a lowered position within the frame 30 and the outboard end of the movable floor 40 is in a raised position. As the outboard ramp 60 moves to a deployed position, the outboard end of the movable floor 40 moves in a downward arcuate path to a lowered position. At the same time, the inboard end of the movable floor 40 moves upward. When the outboard ramp 60 is in a deployed position, the outboard portion 44 of the movable floor 40 has a slope approximately equal to the slope of the deployed outboard ramp 60, the inboard portion 42 of the movable floor 40 is coplanar with or substantially parallel to the floor of the vehicle. In this regard, variation between the inboard portion 42 of movable floor 40 and the vehicle floor may include an offset in of up to one inch or more. Further, although the inboard portion 42 of movable floor 40 is substantially parallel to the vehicle floor, angular differences in the range of 0 to 20 degrees are possible and should be considered within the scope of the disclosed subject matter.

When the outboard ramp 60 is in a deployed position, the sloped portion of the ramp assembly 20 has a slope defined as ratio of the height (rise) of the sloped portion to the horizontal length (run) of the sloped portion. To provide a slope that is gradual enough to allow safe ingress to and egress from the vehicle by a person in a wheelchair, the ratio of rise to run is generally no greater than 1:4. Smaller ratios, such as 1:5, 1:6, and 1:7 are preferable from a safety standpoint, but given vehicle floor height constraints, smaller ratios generally require longer ramps, which result in larger actuation motors and more space required within the vehicle to stow the ramps. Although embodiments are not limited to any particular ratio, a ratio of 1:6 has been found to provide a balance between the increased safety of a more gradual slope and the design constraints inherent in a longer ramp.

Counterbalance Assembly

Figure 12:
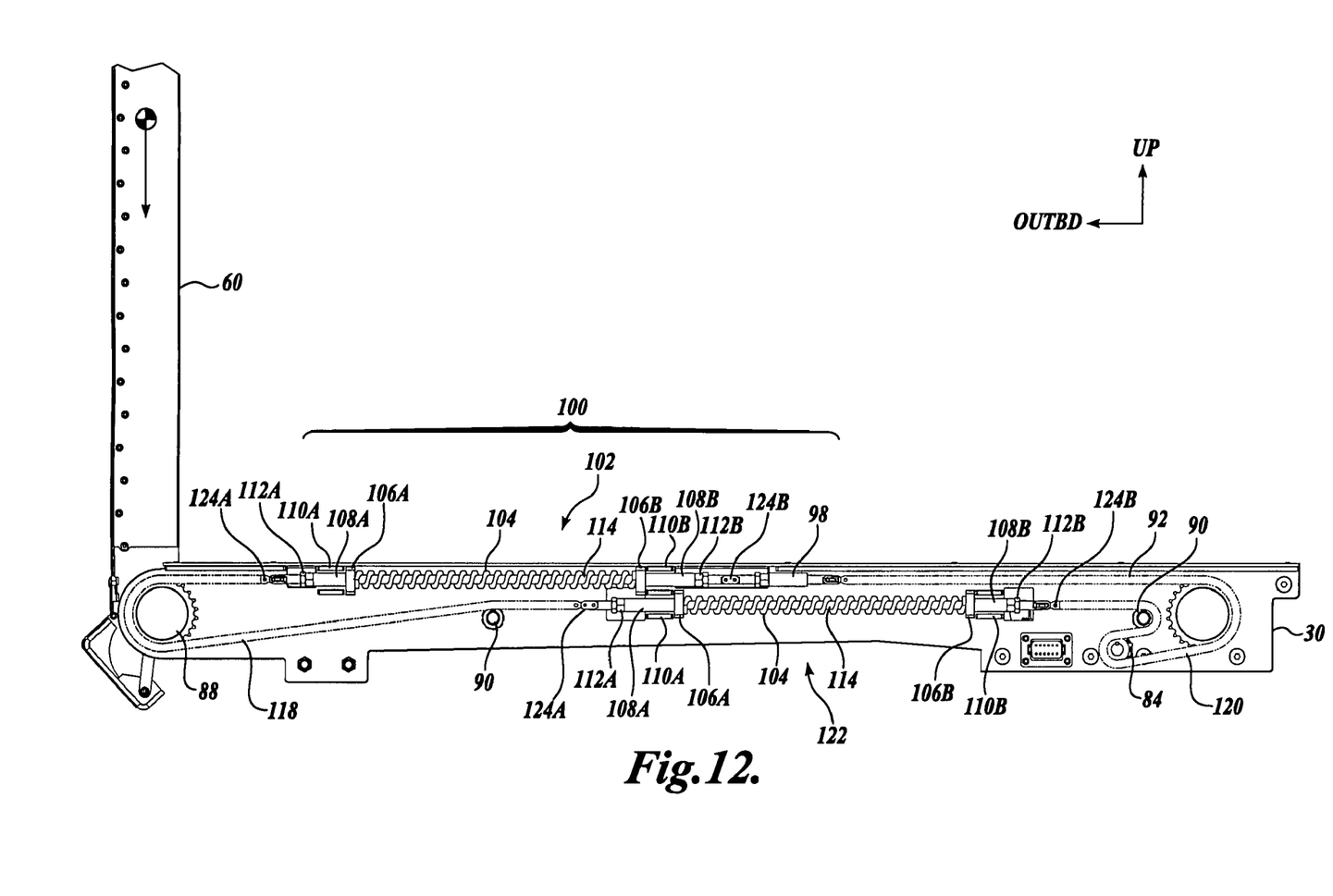
FIG. 12 is a partial side view of the ramp assembly shown in FIG. 1, with the outboard ramp in a neutral position.
Figure 13:
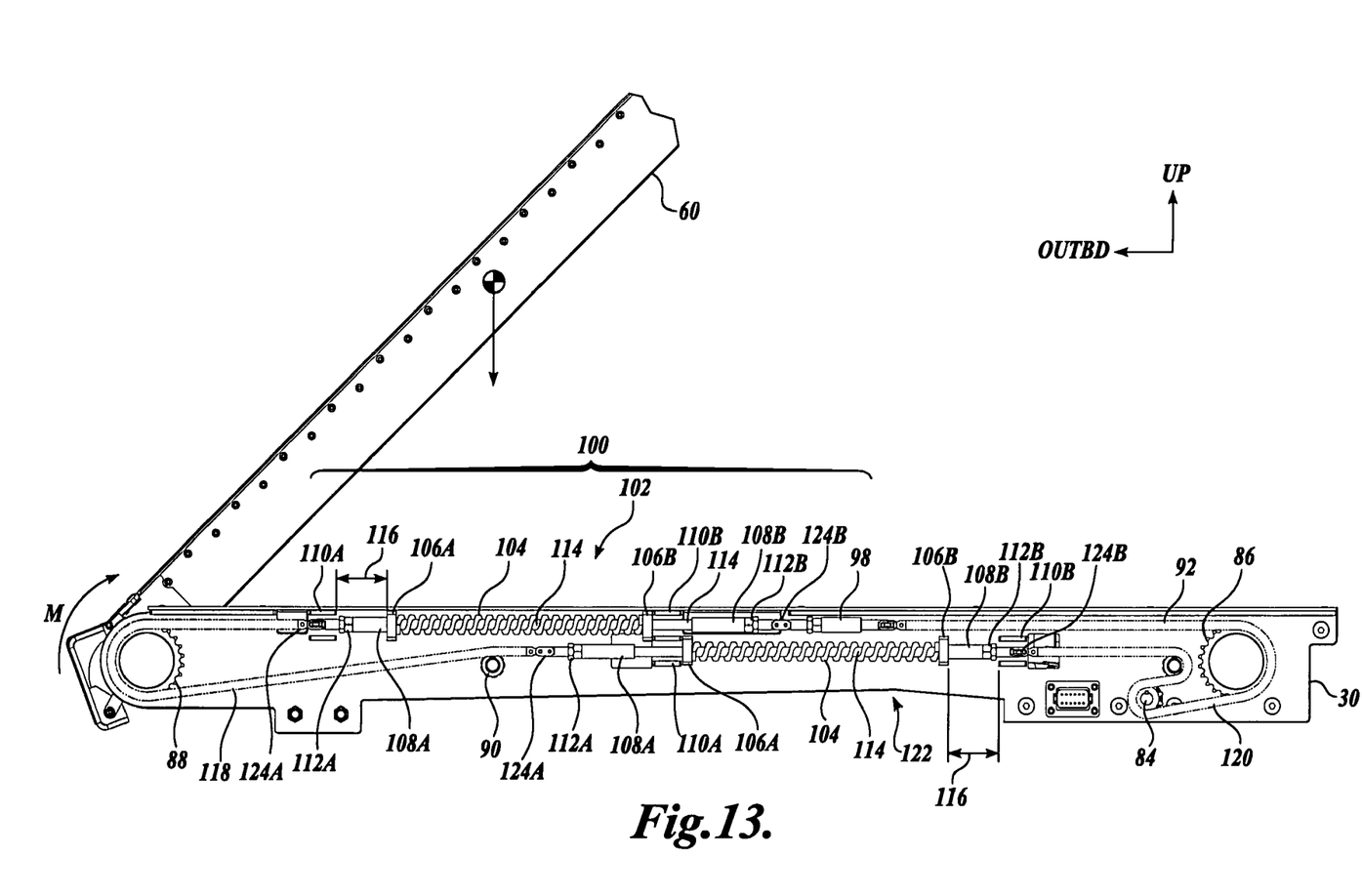
FIG. 13 is a partial side view of the ramp assembly shown in FIG. 1, with the outboard ramp positioned between the neutral position and the stowed position.
Figure 14:
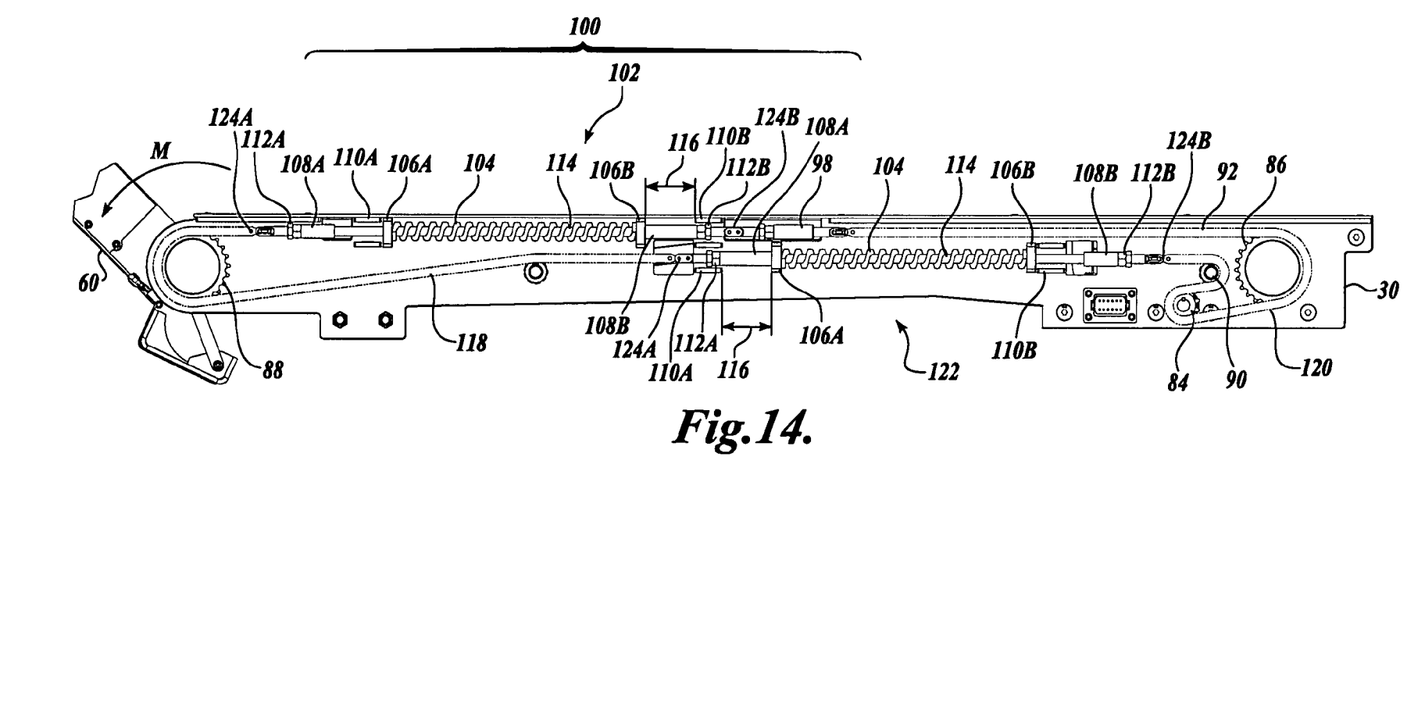
FIG. 14 is a partial side view of the ramp assembly shown in FIG. 1, with the outboard ramp positioned between the neutral position and a deployed position.

FIG. 12 illustrates the outboard ramp 20 in a position between the stowed position and a deployed position. In the illustrated position, the outboard ramp 60 forms an angle of approximately 90° with the frame 30. The center of gravity (CG) of the outboard ramp 60 is located approximately over the axis of rotation of the outboard sprocket 88. In this "neutral" position, the CG of the outboard ramp 60 does not impart a moment M about the axis of rotation of the outboard sprocket 88. FIG. 13 shows the outboard ramp 60 at a position between the neutral position and the stowed position. When the outboard ramp is so positioned, the CG of the outboard ramp is located inboard of the axis of rotation of the outboard sprocket 88. Accordingly, the CG of the outboard ramp 60 imparts moment M about the axis of rotation of the outboard sprocket 88, wherein the moment M tends to move the outboard ramp toward the stowed position. FIG. 14 shows the outboard ramp 60 at a position between the neutral position and a deployed position. In this position, the CG of the outboard ramp 60 is located outboard of the axis of rotation of the outboard sprocket 88. As a result, the CG of the outboard ramp 60 imparts moment M about the axis of rotation of the outboard sprocket 88, wherein the moment M tends to move the outboard ramp toward a deployed position. Although the neutral position is illustrated as a position wherein the outboard ramp 60 is positioned an angle of approximately 90° from the frame 30, it should be understood that the position of the CG of the outboard ramp 60 can vary, resulting in a neutral position wherein the angle of the outboard ramp to the frame 30 is greater than or less than 90°.

As shown in FIGS. 12-14, the ramp assembly 20 may include a counterbalance assembly 100 to counteract the moment M imparted about the axis of rotation of the outboard sprocket 88 by the CG of the outboard ramp 60. Because the moment M is reacted by the counterbalance assembly 100, the torque output required from the motor 82 of the drive assembly 80 is reduced. The reduced torque requirement allows for the use of a smaller motor 82.

In the embodiment illustrated in FIGS. 12-14, the counterbalance assembly 100 includes an upper spring assembly 102 and a lower spring assembly 122 on each of the forward and rear sides of the ramp assembly 20, for a total of four spring assemblies. For the sake of clarity, the upper and lower spring assemblies 102, 122 located on the forward side of the ramp assembly 20 are described with the understanding that similar upper and lower spring assemblies 102, 122 are located on the rear side of the ramp assembly 20.

Referring to FIG. 12, the upper and lower spring assemblies 102, 122 are attached in series to segments of the drive chain 92. More specifically, the outboard end of the upper spring assembly 102 is coupled to the upper end of an outboard chain segment 118, and the inboard end of the upper spring assembly 102 is coupled to the upper end of an inboard chain segment 120. The outboard end of the lower spring assembly 122 is coupled to the lower end of the outboard chain segment 118, and the inboard end of the lower spring assembly 122 is coupled to the lower end of the inboard chain segment 120. In this manner, the drive chain 92 forms an endless loop, wherein the loop comprises the following components in order: outboard chain segment 118, upper spring assembly 102, inboard chain segment 120, and lower spring assembly 122.

The lower spring assembly 122 includes a rigid rod 114 positioned in an inboard/outboard orientation. The outboard end of the rod 114 is coupled to the lower end of the outboard chain segment 118 with a pinned connection at 124A. Similarly, the inboard end of the rod 114 is coupled to the lower end of the inboard chain segment 120 with a pinned connection at 124B. A helical compression spring 104 is concentrically arranged with respect to the rod 114 so that the rod 114 is disposed within the center of the coils of the spring 104.

The lower spring assembly 122 further includes a spring fitting 106A, a cylindrical bushing 108A, and an adjustment nut 112A associated with the outboard end region of the rigid rod 114. The spring fitting 106A has an aperture with a diameter larger than the outer diameter of the rod 114, but smaller than the outer diameter of the compression spring 104. The spring fitting 106A is coupled to the outboard end of the rod 114 so that the rod passes through the aperture of the spring fitting 106A. The cylindrical bushing 108A is slidingly coupled to the rod 114 so that a portion of the rod 114 is disposed within the bore of the bushing 108A. Thus, the outboard end of the compression spring 104 bears against the inboard surface the spring fitting 106A, and the outboard surface of the spring fitting 106A bears against the inboard surface of the cylindrical bushing 108A. The adjustment nut 112A threadedly engages a threaded portion of the outboard end of the rod 114. The inboard end of the adjustment nut 112A engages the outboard end of the cylindrical bushing 108A, preventing the cylindrical bushing 108A, the spring fitting 106A, and the outboard end of the compression spring 104 from moving in an outboard direction relative to the rod 114.

Similar to the outboard end of the rod 114, a spring fitting 106B, a bushing 108B, and an adjustment nut 112B are attached to the inboard end of the rod 114. That is, the spring fitting 106B is installed inboard of the compression spring 104, the bushing 108B is installed inboard of the spring fitting 106B, and the adjustment nut 112B installed inboard of the bushing 108.

Still referring to FIG. 12, the compression spring 104 of the described lower spring assembly 122 is compressed between the two spring fittings 106A-B. The combination of the spring fittings 106A-B, bushings 108A-B, and nuts 112A-B prevents the compressed spring from expanding in either the inboard or outboard direction. Further, the preload on the compressed spring 104 can be adjusted by selectively adjusting the distance between the adjustment nuts 112A-B. As the distance between the nuts 112A-B is decreased, the spring 104 is further compressed, increasing the preload on the spring 104. Conversely, if the distance between the nuts 112A-B is increased, the spring 104 expands, and the preload on the spring 104 is decreased.

The compression spring 104 and spring fittings 106A-B are disposed between inboard and outboard end stops 110A-B. Each C-shaped end stop 110A-B includes a channel positioned in the direction of the compression spring and sized to allow the bushings 108A-B and adjustment nuts 112A-B to pass therethrough. The spring fittings 106A-B, however, are sized so as not to pass through the channels, but instead remain disposed between the inboard and outboard end stops 110A-B.

In the illustrated embodiment, the upper spring assembly 102 is identical to the lower spring assembly 122 with one exception. In the illustrated embodiment shown in FIGS. 12-14, the inboard end of the rod 114 is coupled to one end of an optional turnbuckle 98. The other end of the turnbuckle 98 is coupled to the upper end of the inboard chain segment 120. The tension of the drive chain 92 is selectively adjustable by rotating the turnbuckle 98. Although the turnbuckle 98 is illustrated attached to the inboard end of the upper spring assembly 102, it should be understood that the turnbuckle can be located at any position along the path of the drive chain 92 that does not interfere with the spring assemblies 102, 122 or the sprockets of the drive assembly 80.

FIG. 13 shows the ramp assembly 20 with the outboard ramp 60 located between a neutral position and the stowed position. As the outboard ramp 60 moves toward the stowed position, the CG of the outboard ramp moves inboard, imparting a moment M that tends to move the outboard ramp 60 into the stowed position. Moreover, as the outboard ramp 60 moves further towards the stowed position, the horizontal distance between the axis of rotation of the outboard ramp 60 and the CG of the outboard ramp 60 increases, thus increasing the magnitude of the moment M on the outboard sprocket 88.

The moment M imparted by the CG of the outboard ramp 60 is counteracted by biasing forces provided by the compression of the springs 104 of the upper and lower spring assemblies 102, 122. Referring to FIG. 13, as the outboard ramp 60 moves toward the stowed position, the drive chain 92 moves in a clockwise direction along its path. With regard to the upper spring assembly 102, the clockwise motion of the drive chain 92 drives the outboard adjustment nut 112A, which is threadedly secured to the rod 114, in an inboard direction. As the nut 112A moves inboard, it drives the bushing 108A and the spring fitting 106A inboard, creating a gap 116 between the outboard end of the spring fitting 106A and the inboard end of the end stop 110A. The inboard end of the spring fitting 106A bears against the outboard end of the compression spring 104 so that the outboard end of the compression spring 104 moves inboard with the spring fitting 106A. At the inboard end of the upper spring assembly 102, the bushing 108B and the adjustment nut 112B move inboard with the drive chain 92 and the rod 114. The spring fitting 106B, and therefore the inboard end of the compression spring 104, are prevented from moving inboard by the inboard end stop 110B.

As described above, movement of the outboard ramp 60 from a neutral position to the stowed position causes the outboard end of the upper compression spring 104 to move inboard, while the inboard end remains fixed against the inboard end stop 110B. The resulting compression of the spring 104 creates a force that resists the moment M that results from the CG of the outboard ramp 60. The biasing force is approximately proportional to the amount by which the spring 104 is compressed, i.e., the spring is a linear spring. That is, greater spring compression results in a greater resistive force. As previously noted, the moment M increases as the outboard ramp 60 approaches the stowed position from a neutral position. Accordingly, both the moment M and the resistive force of the spring 104 increase as the outboard ramp 60 approaches the stowed position. The increase in the moment M is sinusoidal, and the increase in the resistive force of the spring 104 is linear. Thus, while the resistive force of the spring 104 does not increase in exact proportion to the increase in the moment M, the resistive force does increase in approximation to the increase of the moment M.

The springs 104 of the counterbalance assembly 100 are preferably selected to minimize the difference between the force supplied by the springs 104 and the force required to counteract the moment M as the outboard ramp 60 reciprocates between the stowed position and a deployed position. For linear springs, the spring stiffness can be selected such that differences due to the linear increase in spring resistance and the sinusoidal increase of the moment M are reduced. In other embodiments, non-linear springs are used so that the resistance supplied by the spring increases at a non-linear rate, allowing the spring resistance to match more closely the force required to resist the moment M as the outboard ramp 60 reciprocates between a stowed position and a deployed position. Non-linear springs are known in the art. For example, a spring formed with a variable coil pitch will exhibit non-linear properties. It should be understood that various known spring configurations providing linear or non-linear reactive force can be included in the counterbalance assembly 100 without departing from the spirit and scope of the present invention. In addition, alternate systems can be used to provide a resistive force, such as pneumatic systems, hydraulic systems, and other systems known in the art.

The lower spring assembly 122 functions in manner similar to that of the upper spring assembly 102. As the outboard ramp 60 moves from a neutral position to the stowed position, the inboard spring fitting 106B moves outboard to compress the spring 104 against the outboard spring fitting 106A, which is prevented from moving in the outboard direction by the outboard end stop 110A. The compression of the spring 104 results in a force that resists the moment M resulting from the CG of the outboard ramp 60.

The resistive forces produced by the upper and lower spring assemblies 102, 122 act on the drive chain 92 in a direction opposite to the moment M. As the moment M shown in FIG. 13 tends to move the drive chain 92 in a clockwise direction, the resistive forces produced by the upper and lower spring assemblies 102, 122 tend to move the drive chain in a counterclockwise direction. To the extent that the resistive forces counteract the moment M, the torque required from the motor 82 to drive the drive assembly 80 is reduced.

FIG. 14 illustrates the ramp assembly 20 with the outboard ramp 60 located between a neutral position and a deployed position. The CG (not shown) of the outboard ramp 60 is located outboard of the axis of rotation of the outboard ramp 60, creating a moment M that tends to move the outboard ramp 60 into the deployed position. The upper and lower spring assemblies are compressed in a similar fashion as discussed with respect to FIG. 13, but in an opposite direction. More specifically, as the moment M tends to move the drive chain 92 in a counterclockwise direction, the upper and lower spring assemblies 102, 122 provide resistive forces that tend to move the drive chain in a clockwise direction.

As previously noted, upper and lower spring assemblies 102, 122 are positioned on the forward and rear sides of the ramp assembly 20. The four spring assemblies cooperate to resist the moment M created when the ramp is not in a neutral position, with each spring assembly providing approximately one fourth of the total resistive force.

It should be appreciated that the number and location of the spring assemblies may vary without departing from the scope of the claimed subject matter. In one alternate embodiment, a single spring assembly is used. Further alternate embodiments may include springs having different stiffnesses.

While illustrative embodiments have been illustrated and described, it will be appreciated that various changes can be made therein without departing from the spirit and scope of the invention.

The invention claimed is:

1. A ramp assembly for a vehicle having a floor, the ramp assembly comprising:
   (a) a ramp disposed within the vehicle, the ramp extending inwardly from a first end when the ramp in a stowed position and outwardly from the first end when the ramp in a deployed position;
   (b) a movable floor having a first end opposite a second end, the first end of the moveable floor being hingedly coupled to the first end of the ramp, the movable floor comprising (1) a first surface and (2) a second surface positioned at an angle relative to the first surface; and
   (c) a reciprocating mechanism in communication with the movable floor to reciprocate the second end of the movable floor between a lowered position when the ramp is in a stowed position and a raised position when the ramp is in a deployed position, wherein the first surface is substantially parallel to the ramp when the ramp is in the deployed position.

2. The ramp assembly of claim 1, wherein the reciprocating mechanism includes a link coupled to the vehicle and a roller rotatably coupled to the link, the roller engaging a bearing surface on the movable floor to reciprocate the second end of the movable floor between the raised position and the lowered position as the link moves relative to the vehicle.

3. The ramp assembly of claim 2, wherein the roller is positioned within a C-shaped catcher.

4. The ramp assembly of claim 1, wherein the ramp is substantially parallel to the floor of the vehicle when the ramp is in the stowed position.

5. The ramp assembly of claim 1, wherein the second surface is substantially parallel with the floor of the vehicle when the ramp is in the deployed position.

6. The ramp assembly of claim 1, further comprising a drive assembly operatively coupled to the ramp to reciprocate the ramp between a stowed position and a deployed position.

7. The ramp assembly of claim 6, wherein the drive assembly comprises:
   (a) a motor; and
   (b) a drive chain assembly forming an endless loop, the drive chain assembly comprising a chain portion operatively coupled to an output shaft of the motor, wherein the drive chain assembly is operatively coupled to the ramp and the reciprocating mechanism so that rotation of the output shaft actuates the ramp and the reciprocating mechanism.

8. The ramp assembly of claim 7, wherein the drive chain assembly further comprises a counterbalance assembly, the counterbalance assembly comprising:
   (a) a first spring for applying a biasing force to the chain portion in a first direction when the ramp is positioned between a neutral position and the deployed position; and
   (b) a second spring for applying a biasing force to the chain portion in a second direction opposite the first direction when the ramp is positioned between the neutral position and the stowed position.

9. The ramp assembly of claim 1, wherein the ramp has a slope of 1:6 or less when the ramp is in the deployed position.

10. The ramp assembly of claim 1, further comprising a closeout assembly, the closeout assembly comprising:
    (a) an end cap hingedly coupled to the ramp; and
    (b) a link having a first end coupled to the end cap, and a second end coupled to the movable floor, wherein reciprocation of the ramp reciprocates the end cap between a closed position when the ramp is in the stowed position, and an open position when the ramp is in the deployed position.

11. The ramp assembly of claim 10, wherein the closeout assembly provides a step surface and at least partially obscures an area between the ramp and the movable floor when the ramp is in the stowed position.

12. A ramp assembly for a vehicle having a floor, the ramp assembly comprising:
    (a) a support member coupled to the vehicle;
    (b) a ramp attached to the support member so that rotation of the support member reciprocates the ramp between a stowed position and a deployed position;
    (c) a movable floor having a first end hingedly coupled to the ramp to define a hinge line, wherein rotation of the support member reciprocates the hinge line between a raised position when the ramp is in a stowed position, and a lowered position when the ramp is in a deployed position; and
    (d) a reciprocating mechanism to reciprocate a second end of the movable floor between a lowered position when the ramp is in the stowed position, and a raised position when the ramp is in the deployed position.

13. The ramp assembly of claim 12, wherein the reciprocating mechanism includes a link coupled to the vehicle and a roller coupled to the link, the roller engaging a bearing surface on the movable floor to reciprocate the second end of the movable floor between the raised position and the lowered position as the link moves relative to the vehicle.

14. The ramp assembly of claim 13, wherein the roller is positioned within a C-shaped catcher.

15. The ramp assembly of claim 12, wherein the ramp is substantially parallel to the floor of the vehicle when the ramp is in the stowed position.

16. The ramp assembly of claim 12, wherein the movable floor comprises a first surface and a second surface positioned at an angle relative to the first surface, the first surface being substantially parallel to the ramp when the ramp is in the deployed position, the second surface being substantially parallel to the floor of the vehicle when the ramp is in the deployed position.

17. The ramp assembly of claim 12, wherein the ramp has a slope of 1:6 or less when the ramp is in the deployed position.

18. A ramp assembly for a vehicle having a floor, the ramp assembly comprising:
    (a) a support member coupled to the vehicle;
    (b) a ramp attached to the support member so that rotation of the support member reciprocates the ramp between a stowed position and a deployed position;
    (c) a movable floor having a first end hingedly coupled to the support member to define a hinge line, wherein rotation of the support member moves the hinge line in an arcuate path;
    (d) a drive assembly operatively coupled to the support member to rotate the support member; and
    (e) a reciprocating mechanism to reciprocate the second end of the movable floor between a lowered position when the ramp is in the stowed position, and a raised position when the ramp is in the deployed position.

19. The ramp assembly of claim 18, wherein the reciprocating mechanism includes a link rotatably coupled to the vehicle and a roller coupled to the link, the roller engaging a bearing surface on the movable floor to reciprocate the second end of the movable floor between the raised position and the lowered position as the link rotates.

20. The ramp assembly of claim 19, wherein the roller is positioned within a C-shaped catcher.

21. The ramp assembly of claim 18, wherein the ramp is substantially parallel to the floor of the vehicle when the ramp is in the stowed position.

22. The ramp assembly of claim 18, wherein the movable floor comprises a first surface and a second surface positioned at an angle relative to the first surface, the first surface being substantially parallel to the ramp when the ramp is in the deployed position, the second surface being substantially parallel to the floor of the vehicle when the ramp is in the deployed position.

23. The ramp assembly of claim 18, wherein the ramp has a slope of 1:6 or less when the ramp is in the deployed position.

\* \* \* \* \*